(12) United States Patent
Dustin et al.

(10) Patent No.: US 10,387,758 B2
(45) Date of Patent: Aug. 20, 2019

(54) OPTIMIZING BALANCE BETWEEN DUPLEX PRINT JOB PERFORMANCE AND DUPLEX PRINT ENGINE WEAR

(71) Applicant: Hewlett-Packard Development Company, L.P., Houston, TX (US)

(72) Inventors: Suzanne L. Dustin, Meridian, ID (US); Brian C. Mayer, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 33 days.

(21) Appl. No.: 15/499,268

(22) Filed: Apr. 27, 2017

(65) Prior Publication Data

US 2018/0314472 A1    Nov. 1, 2018

(51) Int. Cl.
*G06K 15/02*    (2006.01)

(52) U.S. Cl.
CPC ................................ *G06K 15/1856* (2013.01)

(58) Field of Classification Search
None
See application file for complete search history.

(56) References Cited

U.S. PATENT DOCUMENTS

| | | | |
|---|---|---|---|
| 5,758,227 A | 5/1998 | Kopp | |
| 6,865,355 B2 | 3/2005 | Burkes et al. | |
| 7,929,160 B2 | 4/2011 | Burkes et al. | |
| 8,094,333 B2 | 1/2012 | Podl | |
| 2006/0034630 A1* | 2/2006 | Yabe | G03G 15/50 399/82 |
| 2006/0126107 A1 | 6/2006 | Cheung et al. | |
| 2008/0131148 A1* | 6/2008 | Wong | G03G 15/0822 399/27 |
| 2008/0239367 A1* | 10/2008 | Podl | H04N 1/00832 358/1.15 |
| 2009/0086254 A1 | 4/2009 | Duong | |
| 2009/0185213 A1* | 7/2009 | Banton | G03G 15/50 358/1.15 |
| 2009/0231619 A1* | 9/2009 | Takahashi | G06F 21/608 358/1.15 |
| 2011/0317208 A1* | 12/2011 | Kaneda | G06F 3/1212 358/1.15 |
| 2012/0191827 A1* | 7/2012 | Wang | H04L 12/6418 709/221 |

OTHER PUBLICATIONS

Lexmark Ms310/ Ms410 Series, Sep. 15, 2015, online <http://www.fastprinters.com/pdf/lex-ms300-400series.pdf>.
HP Color LaserJet CP6015 Printer Series, Jun. 2008, online <http://h10010.www1.hp.com/wwpc/pscmisc/vac/us/product_pdfs/3463669.pdf>.
HP F2G69A Duplex Unit for LaserJet M604, M605, M606 Series Printers, copyright date 2013, online <https://mindmachine.co.uk/products/HP_Texts/HP_F2G69A_duplexer_-_HP_LJ-M604_series.html>.

* cited by examiner

*Primary Examiner* — Fan Zhang
(74) *Attorney, Agent, or Firm* — Michael A Dryja (57) ABSTRACT

A printing device tracks characteristics regarding duplex print jobs received and printed at the printing device. The print device adjusts the start time of a duplex print engine of the printing device following receipt of a new duplex print job at the printing device to print the new duplex print job, based on the tracked characteristics, to optimize a balance between print job performance and print engine wear.

19 Claims, 6 Drawing Sheets

OPTIMIZING BALANCE BETWEEN DUPLEX PRINT JOB PERFORMANCE AND DUPLEX PRINT ENGINE WEAR

BACKGROUND

Printing devices include printers as well as multi-function printing (MFP) devices that combine printing functionality along with scanning, copying, and/or faxing capabilities. A printing device forms images on media, like sheets of paper. Different printing devices employ different types of printing technologies, including laser and inkjet, and printing devices can be black-and-white or color printing devices. Some types of printing devices can just print on one side of a media sheet, whereas other types of printing devices can print on both sides of a media sheet. These latter printing devices are referred to as duplex printing devices.

DETAILED DESCRIPTION

As noted in the background section, duplex printing devices can form images on both sides of a media sheet. After a print engine of a duplex printing device forms an image on one side of a media sheet, the printing device can, instead of outputting the sheet into an output bin, recall the sheet back into the printing device. A duplex printing path within the printing device results in the print engine then facing the other side of the media sheet so that the engine forms an image on this reverse side of the sheet. The printing device can then expel the media sheet into an output bin.

A duplex printing device has a print engine depth. The print engine depth is the maximum number of images, or the number of media sheets, that can be concurrently actively processed within the printing device. The print engine depth can be three sheets, or six images (i.e., an image on each side of each sheet, which can include a blank image), for instance. After a first sheet has had its first side printed in accordance with a print job, the first sheet is recalled back into the printing device, and while the first sheet is traveling through the duplex printing path of the device, a second sheet has its first side printed in accordance with the print job. After the second sheet has had its first side printed, the second sheet is recalled back into the printing device, and while the second and first sheets are traveling through the duplex printing path, the third sheet has its first side printed in accordance with the print job. After the third sheet has had its first side printed, the third sheet is recalled back into the printing device. As the third sheet is recalled back into the printing device, the first sheet has its second side printed in accordance with the print job.

A fourth sheet has its first side printed in accordance with the print job in close succession to the second side of the first sheet. When the second side of the first sheet has been printed, the first sheet is expelled into an output bin of the printing device. At this time, printing of the first side of the fourth sheet is almost finished, and printing of the second side of the second sheet in accordance with the print job is beginning. When the first side of the fourth sheet is finished, the fourth sheet is recalled back into the printing device. While the fourth sheet is traveling through the duplex printing path, printing of the second side of the second sheet continues, followed in close succession by printing of a first side of a fifth sheet in accordance with the print job. This process continues until there are no more first sides of any sheets to be printed. Then just the remaining second sides are printed until the print job has been completed.

To minimize print engine wear, including the lifetime of moving and other parts of a printing device such as rollers, motors, fusers, and developers, as well as the consumables of the printing device such as toner, and resources like power, the engine depth of the printing device should be at its maximum. That is, the most efficient usage of a printing device, from a wear perspective, occurs when the printing device is printing continuously at maximum engine depth without having to pause for a formatter of the printing device, for instance, to prepare the next image of a print job for printing by the print engine. By comparison, the least efficient usage of a printing device from a wear perspective occurs when the printing device duplex-prints one or two page (i.e., one or two images on one sheet) print jobs consecutively, and the delay between successive print jobs is sufficiently long that the print engine spins down to a not ready state, necessitating its having to be spun back up to a ready state prior to printing the next print job.

To maximize print job performance, by comparison, a printing device begins printing a print job as soon as the print job is received. Therefore, minimizing print engine wear is a goal that is at odds with and contrary to maximizing print job performance. For instance, a strategy to minimize print engine wear may be to not spin up a print engine and begin printing any print job until enough images have been received to maximize the print engine depth at least once during printing. If the printing device receives a print job having six pages (i.e., six images, over three media sheets), the device may begin printing immediately. However, if the printing device receives a print job having just two pages (i.e., two images, over one media sheet), then the device may wait until one or more additional print jobs having a total of four pages are received.

This strategy, though, can severely reduce print job performance, particularly if short print jobs are infrequently received. For example, if the printing device receives a print job having just two pages, and no other print jobs are received until tens of minutes thereafter, the user that initiated the former print job has to wait until the other print jobs are received for printing of his or her print job to even start. This further assumes that the other print jobs that are ultimately received have at least four pages (i.e., four images, over two media sheets) in total. Print job performance thus measurably declines, which can affect user satisfaction with the printing device.

Techniques described herein can alleviate these shortcomings. A duplex printing device can track characteristics regarding duplex print jobs that the printing device receives and prints. The printing device adjusts the start time of a duplex print engine of the printing device following receipt of a new duplex print job, based on the tracked characteristics, to optimize a balance between print job performance and print engine wear. Based on the adjusted start time of the duplex print engine, the printing device may immediately spin up the print engine and begin printing the newly received print job, or wait, for instance, to achieve the optimized balance between print job performance and print engine wear. A user, such as an end user or a system administrator, may be able to bias the balance towards maximizing print job performance, or towards minimizing print engine wear.

FIGS. 1A, 1B, 1C, and 1D show an example duplex printing device 100, such as a laser printer. The printing device 100 includes a media tray 102 in which media sheets 104, such as sheets of paper, have been loaded. The printing device 100 includes an image formation mechanism 106, which can be a black-and-white or a color laser image formation mechanism, or another type of image formatting mechanism. The printing device 100 includes an output guide 100, and an output tray 110, which may be an output bin. The printing device 100 includes a duplex guide 112. The printing device 100 can include other components as well, such as rollers, motors, and so on, which are not depicted in FIGS. 1A-1D for illustrative clarity.

Figure 1A:
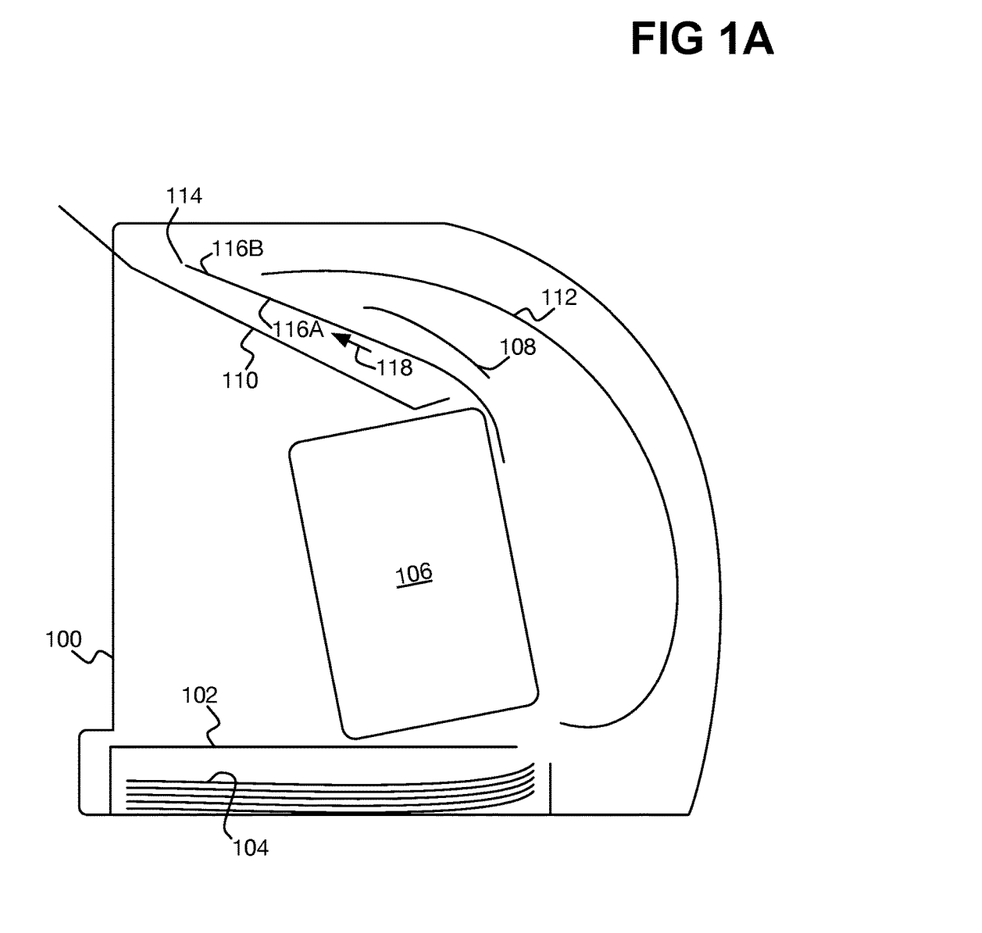
FIGS. 1A, 1B, 1C, and 1D are diagrams depicting an example duplex printing device.

In FIG. 1A, the image formation system 106 is finishing forming an image on a first side 116A of a first media sheet 114 that has been picked from the media sheets 104 within the media tray 102 and advanced past the image formation system 106. The media sheet 114 has a second side 116B opposite the first side 116A, and is being guided by the output guide 108 towards the output tray 110, as indicated by arrow 118. In FIG. 1A, then, the first side 116A and not the second side 116B of the media sheet 114 has been printed.

Figure 1B:
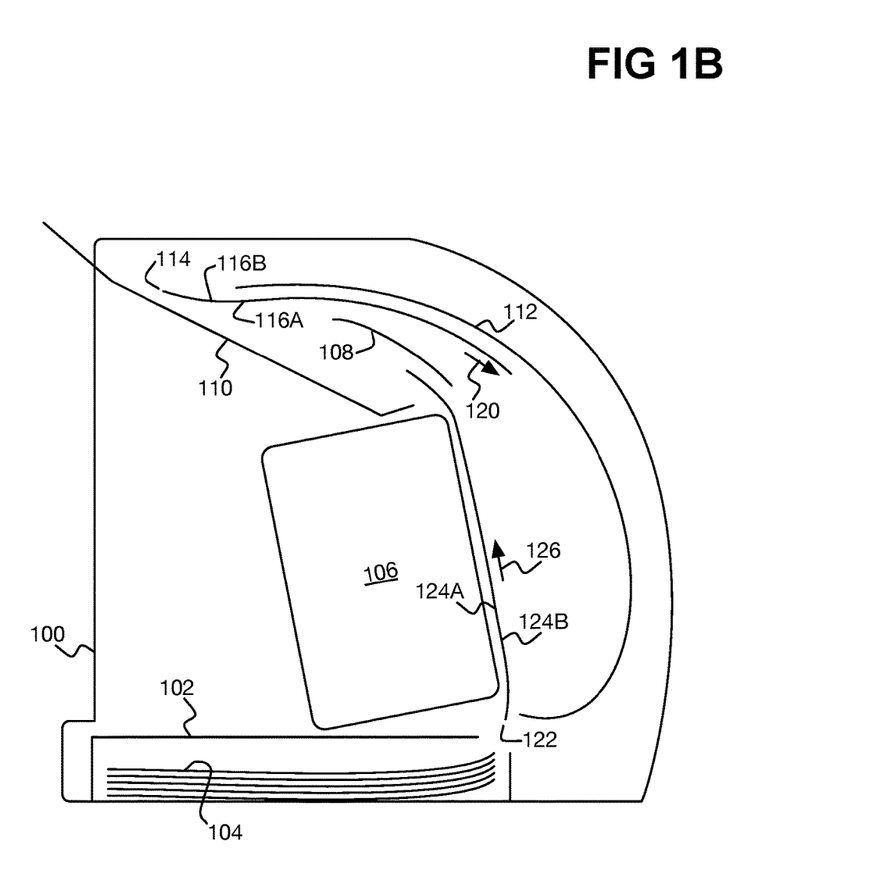

In FIG. 1B, the first media sheet 114 is being rescinded or recalled back into the printing device 100 along the duplex guide 112, as indicated by arrow 120, after the image formation system 106 has finished forming an image on the first side 116A of the media sheet 114. The image formation system 106 is forming an image on a first side 124A of a second media sheet 122 that has been picked from the media sheets 104 within the media tray 102 and advanced past the system 106, as indicated by arrow 126. The media sheet 122 has a second side 124B opposite the first side 124A. In FIG. 1B, then, the first side 124A and not the second side 124B of the media sheet 122 is being printed.

Figure 1C:
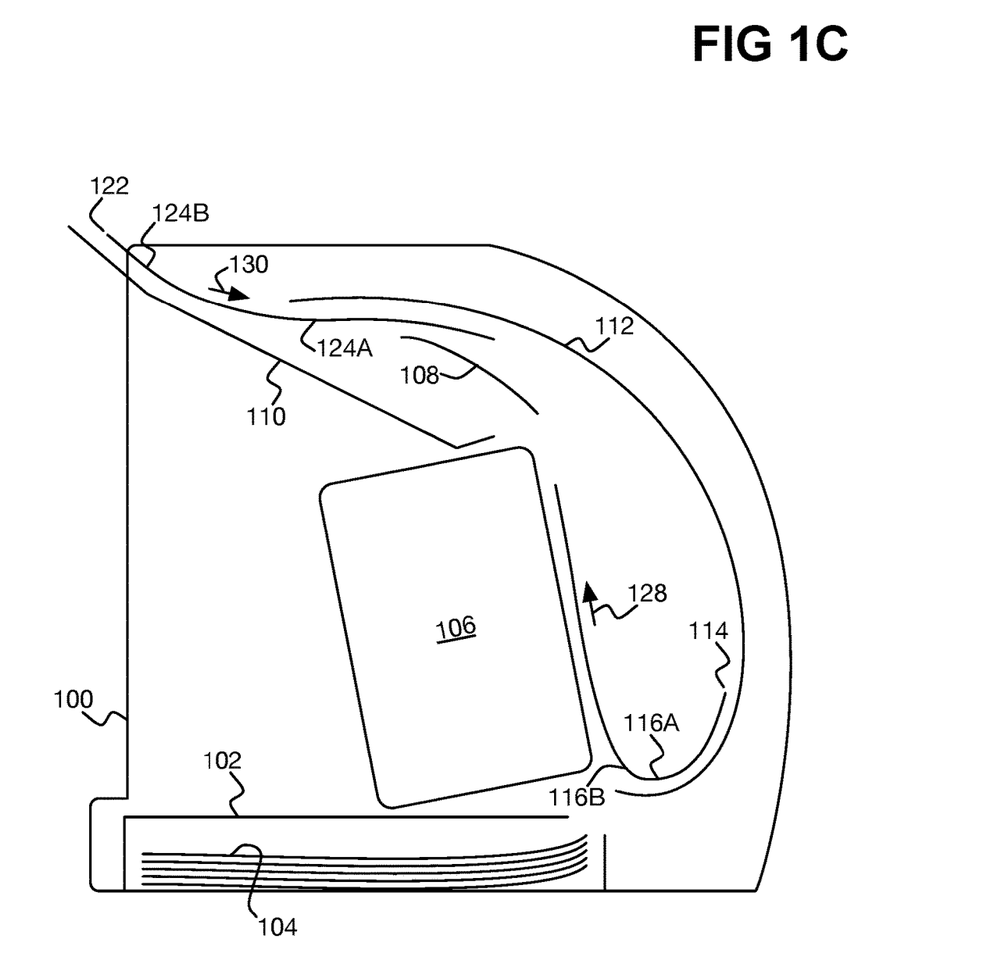

In FIG. 1C, the image formation system 106 is forming an image on the second side 116B of the first media sheet 114, as the duplex guide 112 guides the media sheet 114 back towards the system 106, as indicated by arrow 128. The second media sheet 122 is being rescinded or recalled back into the printing device 100 along the duplex guide 112, as indicated by arrow 130, after the image formation system 106 has finished forming an image on the first side 124A of the media sheet 122. In FIG. 1C, then, the first side 116A of the media sheet 114 has been printed, as before; the second side 116B of the media sheet 114 is being printed; and the first side 124A and not the second side 124B of the media sheet 122 has been printed.

Figure 1D:
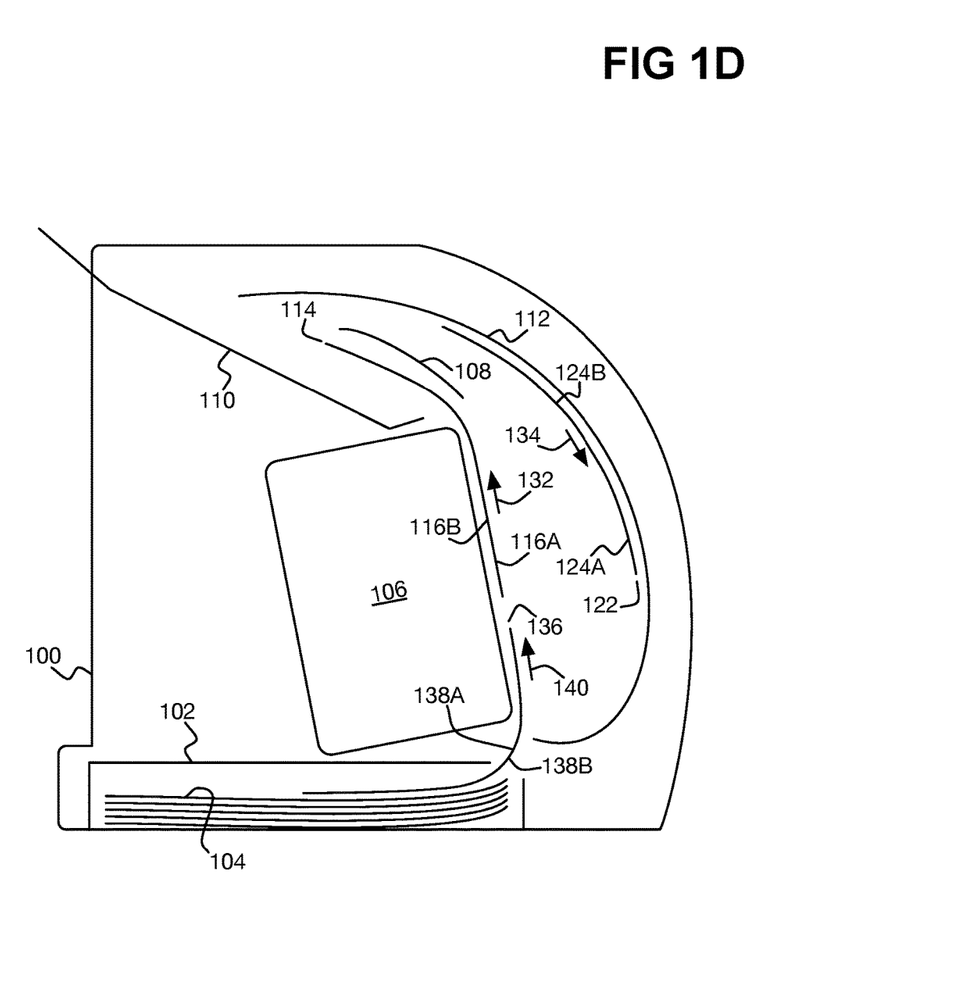

In FIG. 1D, the image formation system 106 is finishing forming an image on the second side 116B of the first media sheet 114, as indicated by arrow 132, and the media sheet 114 will then guided by the output guide 108 and expelled onto the output tray 110. The second media sheet 122 is being advanced along the duplex guide 112 back towards image formation system 106, as indicated by arrow 134. The image formation system 106 is also forming an image on a first side 138A of a third media sheet 136 that has been picked from the media sheets 104 within the media tray 102, as the media sheet 136 is advanced towards and past the image formation system 106, as indicated by arrow 140. The media sheet 136 has a second side 138B opposite the first side 138A. In FIG. 1D, then, the first side 116A of the media sheet 114 has been printed, as before; the second side 116B of the media sheet 114 is being printed, as before; and the first side 124A and not the second side 124B of the media sheet 122 has been printed, as before. Furthermore, the first side 138A and not the second side 138B of the media sheet 136 is being printed.

FIGS. 1A, 1B, 1C, and 1D thus partially depict the duplex printing process as to three media sheets 114, 122, and 136. The engine depth of the printing device 100 in these figures is two sheets, or four images (i.e., one image on each side of each sheet). Maximum engine depth is realized in FIG. 1D, with the printing of an image on the first side 138A of the third media sheet 136. So long as images—of the same or a different print job as that of the image printed on the side 138A of the sheet 136—are ready to be printed on additional media sheets picked from the media tray 102, the printing device 100 can sustain an engine depth of two sheets, or four images, and therefore minimize print engine wear. If such images are not ready to be printed, then print engine wear is not optimized. If print job performance is to be maximized without considering print engine wear, the printing device 100 may begin printing an image on the first side 116A of the first media sheet 114 as soon as the image is ready.

Figure 2:
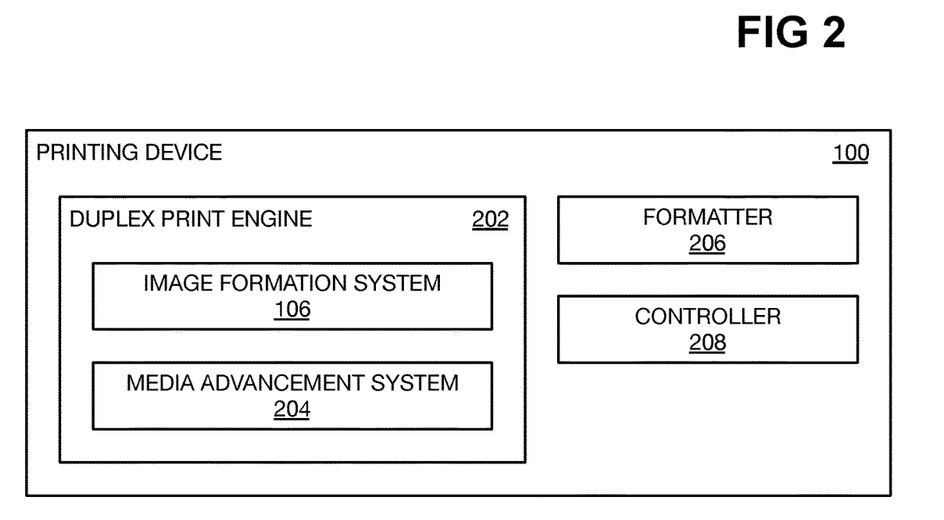
FIG. 2 is a block diagram of an example duplex printing device, such as the printing device of FIGS. 1A-1D.

FIG. 2 is a block diagram of the example printing device 100. The printing device 100 includes a duplex print engine 202 that prints images of print jobs, including duplex print jobs, on media sheets like sheets of paper. The duplex print engine 202 includes the image formation system 106 that has been described, which can be a laser image formation system, for instance. The duplex print engine 202 also includes a media advancement system 204, which includes those components of the printing device 100 that pick, advance, and output media sheets within the printing device 100. For instance, in FIGS. 1A-1D, the guides 108 and 112 can be part of the media advancement system 204, as can the rollers, motors, and so on, which move the paper along the guides 108 and 112.

The printing device 100 includes a formatter 206 and a controller 208. Each of the formatter 206 and the controller 208 may be implemented in hardware or in a combination of hardware and software. For example, each of the formatter 206 and the controller 208 may be implemented as an application-specific integrated circuit (ASIC) or a field-programmable gate array (FPGA). Each of the formatter 206 and the controller 208 may be implemented as a hardware processor that executes computer-executable code or instructions stored on a non-transitory computer-readable data storage medium.

The formatter 206 formats a print job to translate pages thereof into images that the image formation system 106 and the media advancement system 204 can directly understand. The formatter 206 thus processes the print job to convert each page of the print job into the signals that control the duplex print engine 202. Depending upon the complexity of a given page of a print job, and the processing capability of the formatter 206, the formatter 206 can take more time to translate a print job page than it does for the duplex print engine 202 to print an image on a side of a media sheet. This means that during printing of a print job, the print engine 202 may have to pause and spin down while the engine 202 waits for the formatter 206 to provide the next image. Whereas per-page translation time of the formatter 206 is variable, depending on page complexity, per-page formation time of the print engine 202 is basically constant, regardless of page complexity.

The controller 208 can receive print jobs from client computing devices of the printing device 100, and pass them to the formatter 206 for translation. The controller 208 tracks characteristics regarding duplex print jobs received and printed at the printing device 100. Furthermore, the controller 208 determines, or adjusts, the start time when the duplex print engine 202 is to begin printing the first image of a newly received duplex print job, and starts the duplex print engine at the determined or adjusted start time. The controller 208 determines the start time for a newly received duplex print job based on the characteristics that the controller 208 tracked, to optimize a balance between print job performance and print engine wear, which may be user-biased towards maximizing performance or minimizing wear.

Figure 3:
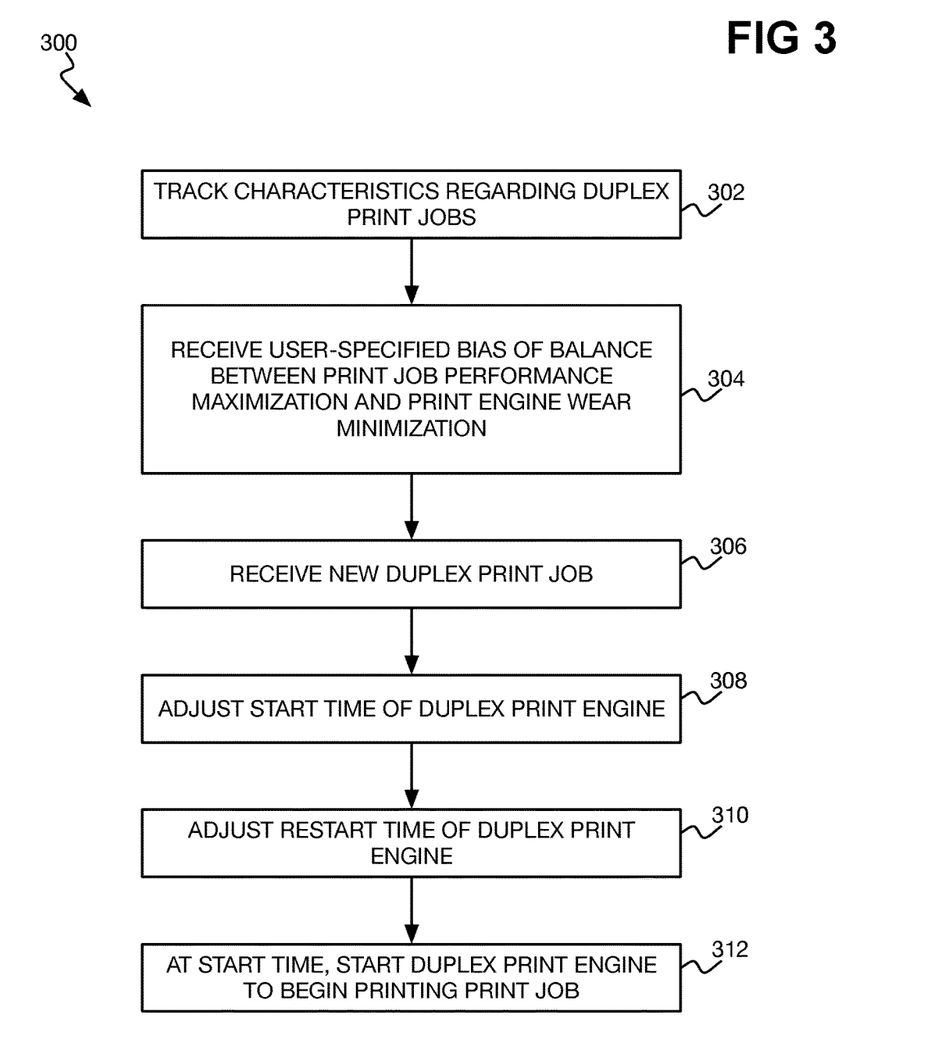
FIG. 3 is a flowchart of an example method that a duplex printing device, such as the printing device of FIGS. 1A-1D and/or 2, performs to optimize a balance between duplex print job performance and print engine wear.

FIG. 3 shows an example method 300 that the printing device 100 performs to optimize the balance between print job performance and print engine wear in determining the start time at which to start the duplex print engine 202 to print a received print job. The controller 208 may perform the method 300, for instance. As such, the method 300 may be implemented as computer-executable code stored on a non-transitory computer-readable data storage medium and that is executable by a processor.

The printing device 100 tracks characteristics of duplex print jobs that the device 100 has received and printed (302). The characteristics may be tracked for a most recent specified number of duplex print jobs, such as twenty. Several example characteristics of duplex print jobs that the printing device 100 can track are now described, as well as how they can be employed to optimize the balance between print job performance and print job wear when determining print job start time.

The printing device 100 can track the average duplex print job length, in number of pages. In determining the average print job length, statistical outliers—print jobs that are very short or that are very long—may first be discarded. As one example, the shortest print job and the longest print job may be discarded when determining the average print job length. The average print job length can be useful to optimize the balance between print job performance and print job wear.

For instance, if a newly received print job is much shorter than the maximum engine depth, but if the average print job length is generally long (i.e., approaching or greater than the maximum engine depth), then it can be expected that the printing device 100 has to wait for just one more job to maximize engine depth. Therefore, the printing device 100 may conclude that reducing print job performance of the newly received print job just to the extent of waiting for another print job is a worthwhile tradeoff to minimize print engine wear by maximizing engine depth. By comparison, if the average print job length is very short, then it may be expected that the printing device 100 has to wait for multiple additional jobs to maximize depth. The printing device 100 may conclude that this more severe reduction in print job performance of the newly received print job—as well as reducing print job performance of one or more additional print jobs—is not a worthwhile tradeoff in minimizing print engine wear by maximizing engine depth.

The printing device 100 can track the average engine depth and the realized maximum engine depth, in number of pages. The average engine depth can be the number of pages, or images, of the duplex print engine 202 when printing the print jobs. The printing device 100 of FIGS. 1A-1D has an absolute maximum engine depth of four images, or pages. However, on average, the engine depth may be a lesser number of images. Furthermore, the realized maximum engine depth is the highest engine depth that has been achieved in any tracked print job. For example, although the printing device 100 may have an absolute maximum engine depth of four images, or pages, no currently tracked print job may have exceeded three images.

In optimizing the balance between print job performance and print job wear, the average engine depth and the realized maximum engine depth can provide insight into the complexity of the received print jobs with respect to how long the formatter 206 takes to translate the jobs into images understandable by the print engine 202. Therefore, when a new print job is received, its complexity can be predicted based on the average and realized maximum engine depths of the tracked print jobs. If a bias towards maximizing print job performance is desired, the complexity of the new print job may be assumed to be less than that of tracked print jobs, whereas if a bias towards minimizing print engine wear is desired, the complexity of the new print job may be assumed to be greater than that of tracked print jobs. If there is no bias towards either maximizing performance or minimizing wear, the complexity of the new print may job may be set to that of the tracked print jobs. Using the average engine depth and the realized maximum engine depth, as adjusted, can thus be used to determine when to start the print engine 202 to begin printing a newly received print job.

The printing device 100 can track the average time delay between arrival of consecutive duplex print jobs. This information is useful in optimizing the balance between print job performance and print job wear. For instance, the printing device 100 may receive a new print job that is too short to maximize engine depth. The average print job length may also be short, which means that multiple additional jobs will have to be received before the printing device 100 can maximize engine depth. However, if the average time delay between arrival of consecutive print jobs is very short—e.g., measurable in tens of seconds—then waiting for additional print jobs so that engine depth can be maximized just marginally affects print job performance while minimizing print engine wear.

By comparison, if the average time delay between arrival of consecutive print jobs is relatively long—e.g., two or three minutes—then waiting for a large number of additional print jobs to maximize engine depth more greatly affects print job performance and may be undesirable. However, if the average print job length is long, such that the printing device 100 has to wait for just one additional print job, then waiting for the expected two-to-three minutes may be more acceptable. As another example, though, if the average time delay between arrival of consecutive print jobs is very long—e.g., measurable in hours—then waiting for any additional print job to maximize engine depth may represent an undesired reduction in print job performance.

The printing device 100 can in this respect also track the above information by day and time of day. For instance, during business hours on business days, the average time delay between arrival of consecutive print jobs may be very short, whereas before and after business hours on business days, as well as on weekends and on holidays, the average time delay between arrival of consecutive print jobs may markedly increase. Therefore, when a new print job is received, the printing device 100 may optimize the balance between maximizing print job performance and minimizing print engine wear by considering the tracked print job characteristics specific to the day and time of day of receipt of the new print job.

The printing device 100 can also track the users that initiate the duplex print jobs, which can be useful in optimizing the balance between print job performance maximization and print engine wear minimization. For example, certain types of users may have responsibilities that are more time-critical, such as customer-facing users like salespeople. A salesperson who is with a customer may have a balance optimized more towards maximizing print job performance so that the customer does not have to wait for print jobs initiated by the salesperson to be completed. By comparison, a user who routinely prints status reports that will not be used for a while may have a balance optimized more towards minimizing print engine wear.

The printing device 100 can in this respect also track when duplex print jobs have been picked up at the printing device 100 following their completion. The printing device 100 may have separate output bins in which different print jobs are output, where each output bin has a sensor so that the device 100 can track when a completed print job has been removed from its corresponding output bin. As such, users who routinely let their completed print jobs languish for long periods of time at the printing device 100 before picking them up may have a balance optimized more towards minimizing print engine wear, whereas users who tend to pick up their completed print jobs right away may have a balance optimized more towards maximizing print job performance.

The printing device 100 can track the source of duplex print jobs. For instance, some print jobs may be received from over a network, such as a local-area network (LAN), to which the printing device 100 is connected. A user may use a computing device, like a desktop or laptop computer, connected to the same LAN to initiate a print job for printing at the printing device 100. This type of print job has a remote source; a user does not have to be physically present at the printing device 100 to initiate a print job.

By comparison, other print jobs may be received via a direct connection of a computing device, or a removable storage device like a flash drive, to the printing device 100 in a non-networked manner, such as via a universal serial bus (USB) port. This type of print job has a local source; a user has to be physically present at the printing device 100 to initiate a print job. Therefore, remote source print jobs may have a balance biased more towards minimizing print engine wear, whereas local source print jobs may have a balance biased more towards maximizing print job performance.

The printing device can receive a user-specified degree as to biasing the balance between print job performance and print engine wear towards the former or the latter (304). For example, the baseline balance may be to neither bias towards maximizing print job performance at the expense of print engine wear or towards minimizing print engine wear at the expense of print job performance. The tracked characteristics of received and completed print jobs, as well as information regarding a newly received print job, are used to determine when to start the print engine 202 to begin printing the newly received print job.

For instance, favoring neither print job performance nor print engine wear can mean that the average duplex print job length that has been tracked from the prior print jobs can be used to predict the length of the next print job (after the newly received print job) that will be received. If the balance is biased towards print job performance, then the average print job length may be increased in accordance with the user-specified degree of such bias, because assuming that the next print job will have a longer length than those previously received can result in an earlier start time of the new print job being determined. If the balance is biased towards minimizing print engine wear, then the average print job length may be decreased in accordance with the user-specified degree of such bias.

Similarly, favoring neither print job performance nor print engine wear can mean that the average engine depth and the realized maximum engine depth that have been tracked from the prior print jobs can be used to predict the corresponding depths of the newly received print job, which has yet to be formatted by the formatter 206. If the balance is biased towards print job performance, then these engine depths may be increased in accordance with the user-specified degree of such bias, which results in an assumption that the new print job has less complexity than prior print jobs. By comparison, if the balance is biased towards minimizing print engine wear, then the engine depths can be decreased in accordance with the user-specified degree of bias, resulting in an assumption that the new print job has more complexity than prior jobs.

Favoring neither print job performance nor print engine wear can mean that the average time delay between arrival of consecutive print jobs is used to predict when the next print job (after the newly received print job) will be received. If the balance is biased towards print job performance, then the average time delay may be increased in accordance with the user-specified degree of such bias; increasing the average time delay can mean that the delay will result in too great an impact on print job performance (although in likelihood it will not). By comparison, if the balance is biased towards minimizing print engine wear, then the average time delay may be decreased in accordance with the user-specified degree of the bias; decreasing the average time delay can mean that the delay will result in an acceptable impact on print job performance (although in likelihood it may not).

The baseline balance between maximizing print job performance and minimizing print engine wear can equate to a baseline maximum length of time that the printing device 100 will wait before starting the print engine 202 to begin printing a newly received print job. The user-specified degree of biasing this balance towards maximizing performance or minimizing wear can received via a slider graphical user interface (GUI) element, the middle of which corresponds to the baseline balance. One end of the element corresponds to maximum print job performance, and the other end of the element corresponds to minimal print engine wear. A user can thus specify how much he or she wishes to bias towards performance or wear by sliding the slider.

Complete bias towards print job performance can mean that print engine wear is not considered at all when determining when to start the print engine 202 to begin printing a newly received print job. Rather, as soon as the print job is received, the print engine 202 starts printing the print job. By comparison, complete bias towards print engine wear can mean specifying a given upper maximum in delaying when to start the print engine 202 upon receipt of a print job. In this case, print job performance is still considered. This is because failing to consider print job performance at all may mean that the print engine 202 does not start until a sufficient number of print jobs have been received so that the engine 202 can continuously print a number of sheets corresponding to the currently installed consumables, such as toner or media sheets 104 loaded in the tray 102, without interruption, which is unlikely at best.

Therefore, user specification of the degree to which to bias the balance between print job performance maximization and print engine wear minimization can influence how the tracked parameters of prior print jobs are used to determine the start time of a newly received print job. This user specification can also influence the baseline length of time that the printing device 100 will wait for another print job in adjusting or determining the start time of the new print job. The baseline length of time, however, is one of degree and not of absolute number, since the tracked characteristics of prior print jobs can affect this length of time in effect.

The printing device 100 receives a new duplex print job (306), and then determines the start time at which to begin the duplex print engine 202 to print the print job (308). Such start time determination can adjust the start time, to delay the print engine 202 from immediately spinning up to begin printing the print job as soon as the formatter 206 has formatted a first image of the print job. The start time can be determined after the new print job is determined because characteristics of the new print job can affect determination of the start time. For example, the day and time of day when the print job is received, the user that initiated the print job, and whether the print job is local or remote can affect the start time determination, as noted above. The number of pages of the print job can also affect the start time determination.

The printing device 100 adjusts the start time by taking into account the characteristics of the previously received print jobs that have been tracked, in relation to the balance between print job performance and print engine wear as may have been biased towards the former or the latter by the user. For example, the printing device 100 may delay the start time so that the formatter 206 has processed a greater number of pages, if the expected complexity of the print job, as informed by the average and realized maximum print engine depths of the tracked prior print jobs, is high. As another example, the baseline determination of start time may be to immediately begin the duplex print engine 202. This start time may then be delayed based on the number of pages of the print job, in relation to when the next print job is expected to be received, as informed by the average delay between arrival of print jobs, vis-à-vis the biased balance between print job performance and print engine wear.

The printing device 100 can also determine or adjust the restart time of the duplex print engine 202 (310). Whereas the determined start time dictates when the duplex print engine 202 is spun up to begin printing a new print job, the determined restart time dictates how long the duplex print engine 202 waits to again spin up after spinning down during printing of the print job due to the formatter 206 not timely providing another image. That is, the print job may be more complicated than the printing device 100 expected from prior print jobs. Therefore, the engine depth may have been depleted, which means that the duplex print engine 202 is not actively printing on any media sheet in satisfaction of the print job. After a delay, the print engine 202 will thus spin down.

To determine when to restart the duplex print engine 202, the printing device 100 may as a baseline wait until the formatter 206 has finished translating the next page of the print job. However, the tracked characteristics of prior print jobs can inform this restart time, to delay the restart time so that the print engine 202 does not spin down excessively while completing a given print job. For example, the printing device 100 can inspect the average print depth, as influenced by the bias between print job performance and print engine wear, to determine that restart of the duplex print engine 202 should not occur until the formatter 206 has finished translating a specified number of additional pages of the print job.

Furthermore, the tracked characteristics regarding print jobs can include the average number of times the duplex print engine 202 is temporarily spun down during a print job (with statistical outliers discarded from the computation), and this information can be used to determine when to restart the duplex print engine 202. For instance, if on average the duplex print engine 202 is spun down once or less than once, then the restart time may not be delayed, because if the print engine 202 does spin down during the current print job, the likelihood is that the engine 202 will not spin down again. Stated another way, insofar as spin down of the print engine 202 results from the formatter 206 encountering an overly complex page of a print job, if on average the engine 202 spun down once or less in the past, then this means that the likelihood is that any print job has just one overly complex page that causes the print engine 202 to spin down.

By comparison, if on average the duplex print engine 202 is spun down more than once, then the restart time may be delayed, because there is a greater likelihood that the engine 202 will have to spin down again if the restart time is not delayed to provide the formatter 206 with extra time to process pages of the print job. The average number of times the print engine 202 has spun down during prior print jobs can be influenced by the user-specified degree of bias of the balance between print job performance and print engine wear. If the user biases towards print engine wear minimization, then the tracked average number of times of spin down may be correspondingly increased, potentially resulting in fewer spin downs of the print engine 202 and thus less print engine wear. Similarly, if the user biases towards print job performance maximization, then the tracked average number of times of spin down may be correspondingly decreased.

Once the printing device 100 has adjusted the start time and the restart time of the duplex print engine 202, the printing device 100 starts the print engine 202 at the determined start time to begin printing the received new duplex print job (312). If the print engine 202 spins down during printing, then restarting of the print engine 202 (i.e., spinning the print engine 202 back up) occurs according to the determined restart time. Once the printing device 100 has completed printing the print job, the method 300 is repeated, where the tracked characteristics of completed print jobs can be updated to reflect the just-completed print job.

The techniques described herein provide a way to optimize the balance between duplex print job performance and duplex print engine wear. Machine learning is employed to track characteristics of duplex print jobs that a printing device has printed. Based on this learning, the printing device can dynamically adjust both the start time and restart time of its print engine, so that the balance between performance and wear is optimized. Furthermore, a user can bias this balance towards print job performance, or towards print engine wear minimization.

We claim:

1. A method comprising:
   tracking, by a printing device, characteristics regarding duplex print jobs received and printed at the printing device, including an average duplex print job length by number of pages; and
   adjusting, by the printing device, start time of a duplex print engine of the printing device following receipt of a new duplex print job at the printing device to print the new duplex print job, based on the tracked characteristics, to optimize a balance between print job performance and print engine wear, including:
   responsive to the new duplex print job having a number of pages less than a maximum engine depth of the duplex print engine, delaying the start time of the duplex print engine to print the new duplex print job if the average duplex print job length is greater than the maximum engine depth of the duplex print engine, such that waiting for just one more duplex print job will on average maximize an engine depth of the duplex print job engine.

2. The method of claim 1, wherein print job performance is maximized in accordance with immediately starting the duplex print engine following receipt of the new duplex print job and after formatting a first page of the new duplex print job.

3. The method of claim 2, wherein print engine wear is minimized in accordance with starting the print engine following receipt of the new duplex print job and after formatting a number of pages to maximize engine depth of the duplex print engine.

4. The method of claim 3, wherein maximizing print job performance is contrary to minimizing print engine wear.

5. The method of claim 1, further comprising:
receiving, by the printing device, a user-specified degree as to bias optimization of the balance between print job performance and print job wear towards print job performance or print engine wear.

6. The method of claim 1, further comprising:
adjusting, by the printing device, restart time of the duplex print engine of the printing device following partially complete printing of the new duplex print job and after temporary spin-down of the duplex print engine, based on the tracked characteristics, to optimize the balance between print job performance and print job wear.

7. The method of claim 6, wherein tracking the characteristics regarding the duplex print jobs received and printed at the printing device comprises:
tracking an average number of times the duplex print engine is temporarily spun down while printing any duplex print job.

8. The method of claim 1, wherein tracking the characteristics regarding the duplex print jobs received and printed at the printing device comprises:
tracking an average engine depth of the duplex print job engine and the maximum engine depth of the duplex print job engine, by number of pages.

9. The method of claim 1, wherein tracking the characteristics regarding the duplex print jobs received and printed at the printing device comprises:
tracking an average time delay between arrival of consecutive duplex print jobs.

10. The method of claim 1, wherein tracking the characteristics regarding the duplex print jobs received and printed at the printing device comprises:
tracking a day and time of day at which each duplex print job is received.

11. The method of claim 1, wherein tracking the characteristics regarding the duplex print jobs received and printed at the printing device comprises:
tracking a user that initiated each duplex print job.

12. The method of claim 1, wherein tracking the characteristics regarding the duplex print jobs received and printed at the printing device comprises:
tracking a source of each duplex print job, as one of locally at the printing device and remotely at a computing device communicatively connected to the printing device.

13. The method of claim 1, wherein tracking the characteristics regarding the duplex print jobs received and printed at the printing device comprises:
tracking when each duplex print job was picked up at the printing device following completion of printing the duplex print job.

14. A non-transitory computer-readable data storage medium storing instructions executable by a printing device to:
receive a new duplex print job to print by the printing device;
determine a start time of a duplex print engine of the printing device at which to begin printing the new duplex print job, based on tracked characteristics regarding duplex print jobs received and printed at the printing device, including an average duplex print job length by number of pages, to optimize a balance between print job performance and print engine wear, including:
responsive to the new duplex print job having a number of pages less than a maximum engine depth of the duplex print engine, delaying the start time of the duplex print engine to print the new duplex print job if the average duplex print job length is greater than the maximum engine depth of the duplex print engine, such that waiting for just one more duplex print job will on average maximize an engine depth of the duplex print job engine; and
start the duplex print engine at the determined start time to begin printing the new duplex print job.

15. The non-transitory computer-readable data storage medium of claim 14, wherein print job performance is maximized in accordance with immediately starting the duplex print engine following receipt of the new duplex print job and after formatting a first page of the new duplex print job,
wherein print engine wear is minimized in accordance with starting the print engine following receipt of the new duplex print job and after formatting a number of pages to maximize engine depth of the duplex print engine,
and wherein maximizing print job performance is contrary to minimizing print engine wear.

16. The non-transitory computer-readable data storage medium of claim 14, wherein determining the start time of the duplex print engine is further based on a user-specified degree as to biasing of optimization of the balance between print job performance and print job wear towards print job performance or print engine wear.

17. The non-transitory computer-readable data storage medium of claim 14, wherein the tracked characteristics comprise:
an average engine depth of the duplex print job engine and the maximum engine depth of the duplex print job engine, by number of pages;
an average time delay between arrival of consecutive duplex print jobs; and
a day and time of day at which each duplex print job is received.

18. The non-transitory computer-readable data storage medium of claim 14, wherein the tracked characteristics comprise one or more of:
a source of each duplex print job, as one of locally at the printing device and remotely at a computing device communicatively connected to the printing device;
when each duplex print job was picked up at the printing device following completion of printing the duplex print job.

19. A printing device comprising:
- a formatter to format a received duplex print job to translate pages of the received duplex print jobs into images;
- a duplex print engine to print the images of the received duplex print job on media sheets in a duplexed manner; and
- a controller to determine a start time when the duplex print engine begins to print a first image of the received duplex print job, based on tracked characteristics regarding duplex print jobs received and printed at the printing device, including an average duplex print job length by number of pages, to optimize a balance between print job performance and print engine wear, by:
  - responsive to the new duplex print job having a number of pages less than a maximum engine depth of the duplex print engine, delaying the start time of the duplex print engine to print the new duplex print job if the average duplex print job length is greater than the maximum engine depth of the duplex print engine, such that waiting for just one more duplex print job will on average maximize an engine depth of the duplex print job engine,
- wherein the controller is to start the duplex print engine at the determined start time.

* * * * *